May 15, 1923.
G. W. DUNHAM
TRACTOR
Filed Jan. 30, 1920
1,455,394
5 Sheets-Sheet 2
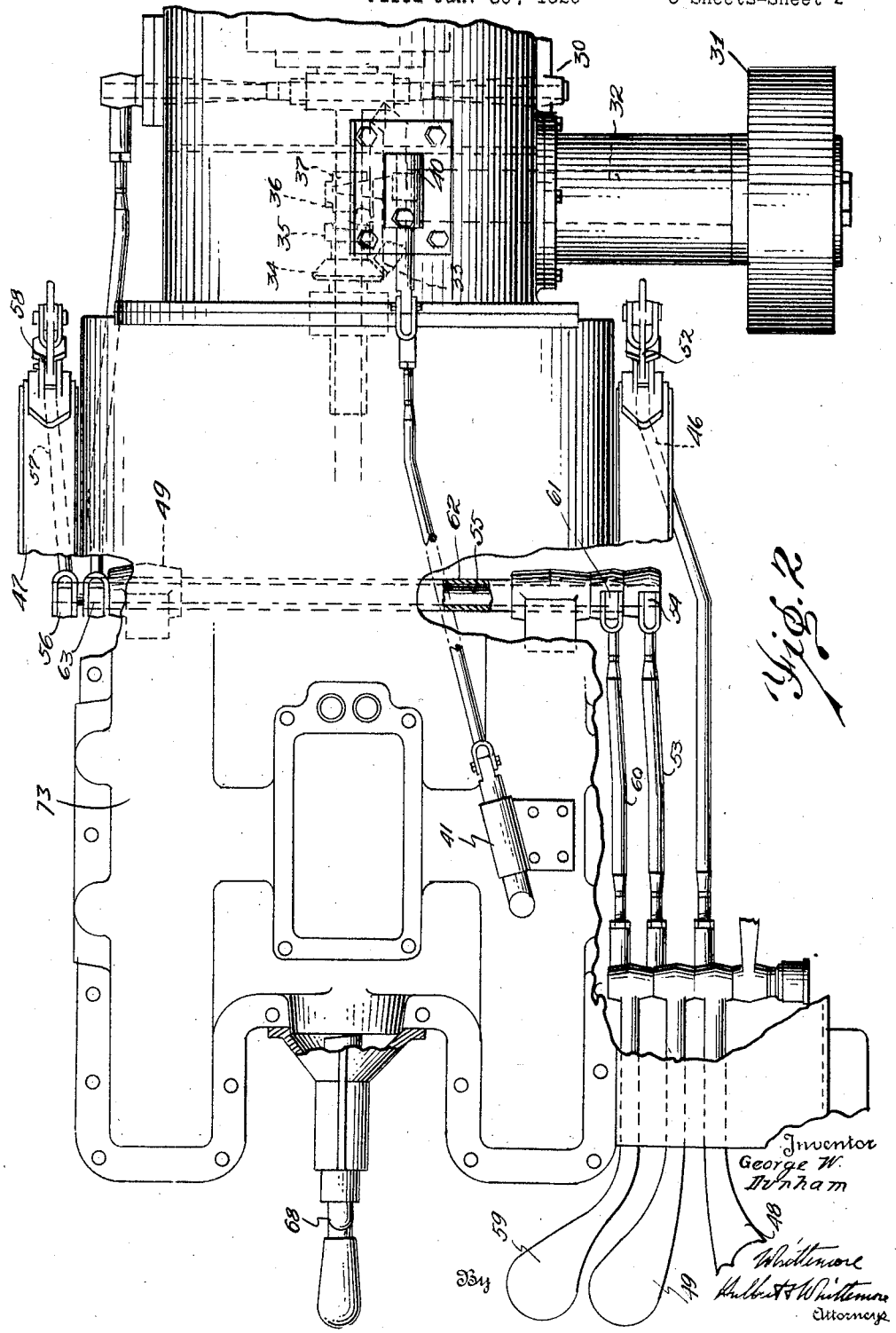

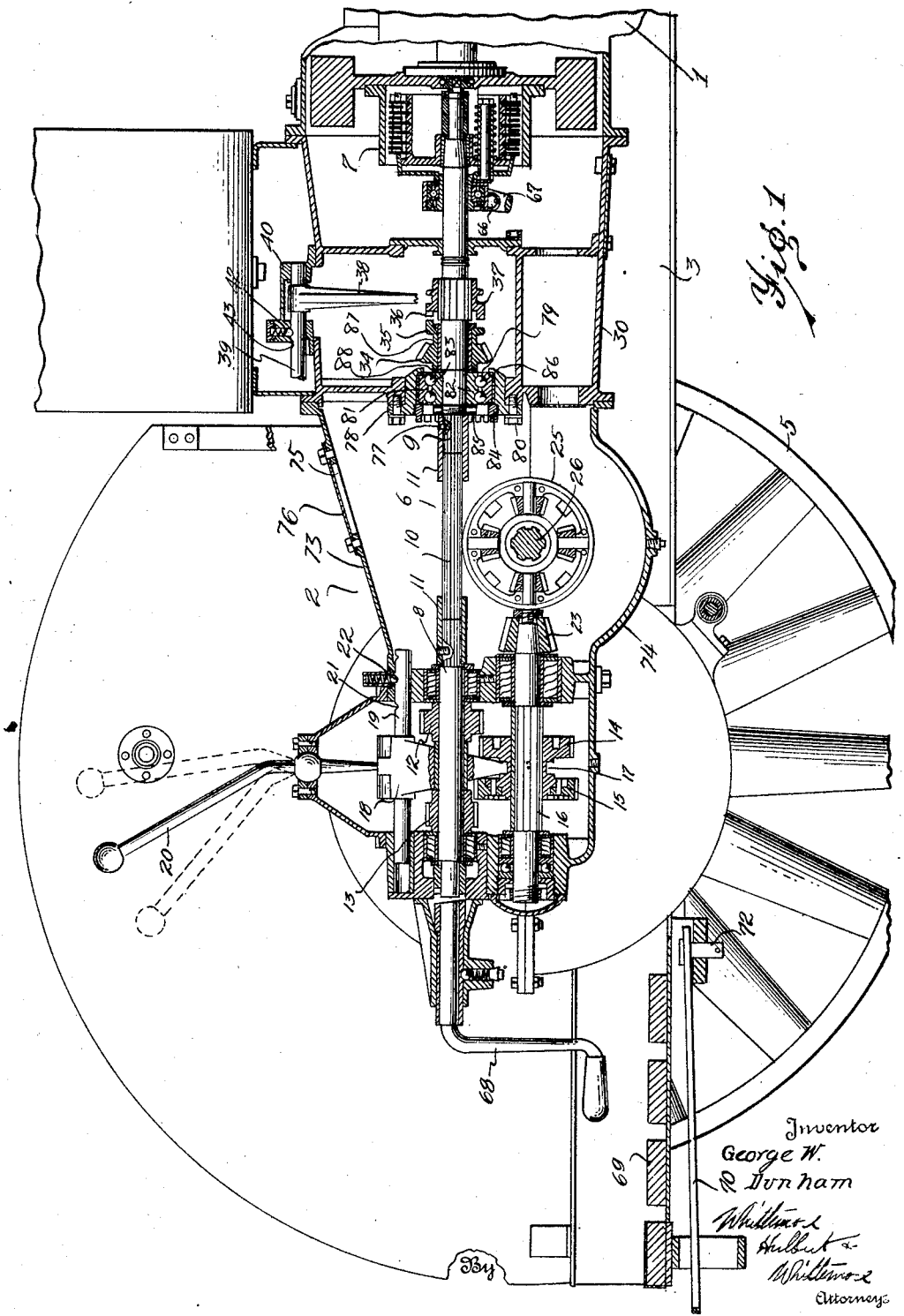

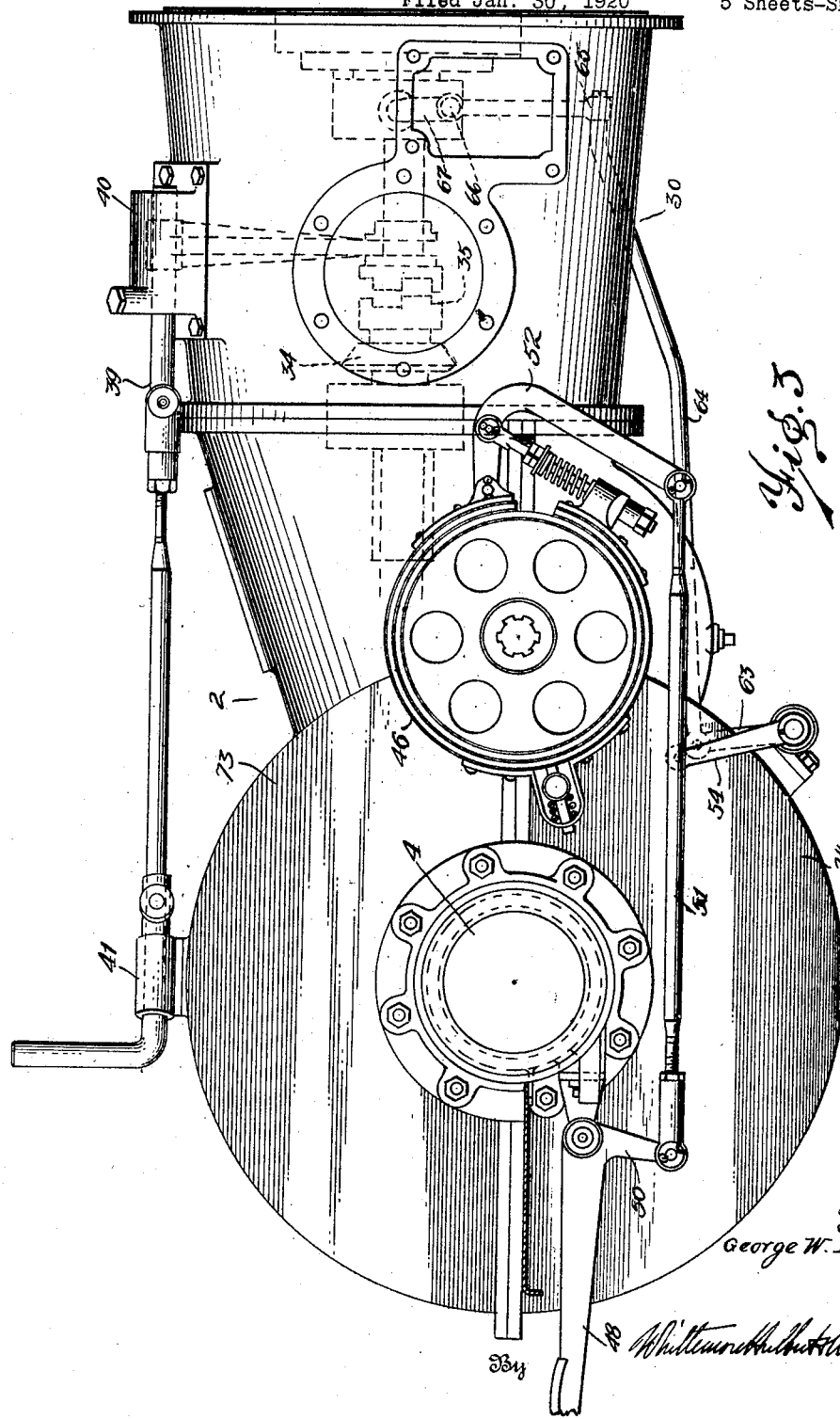

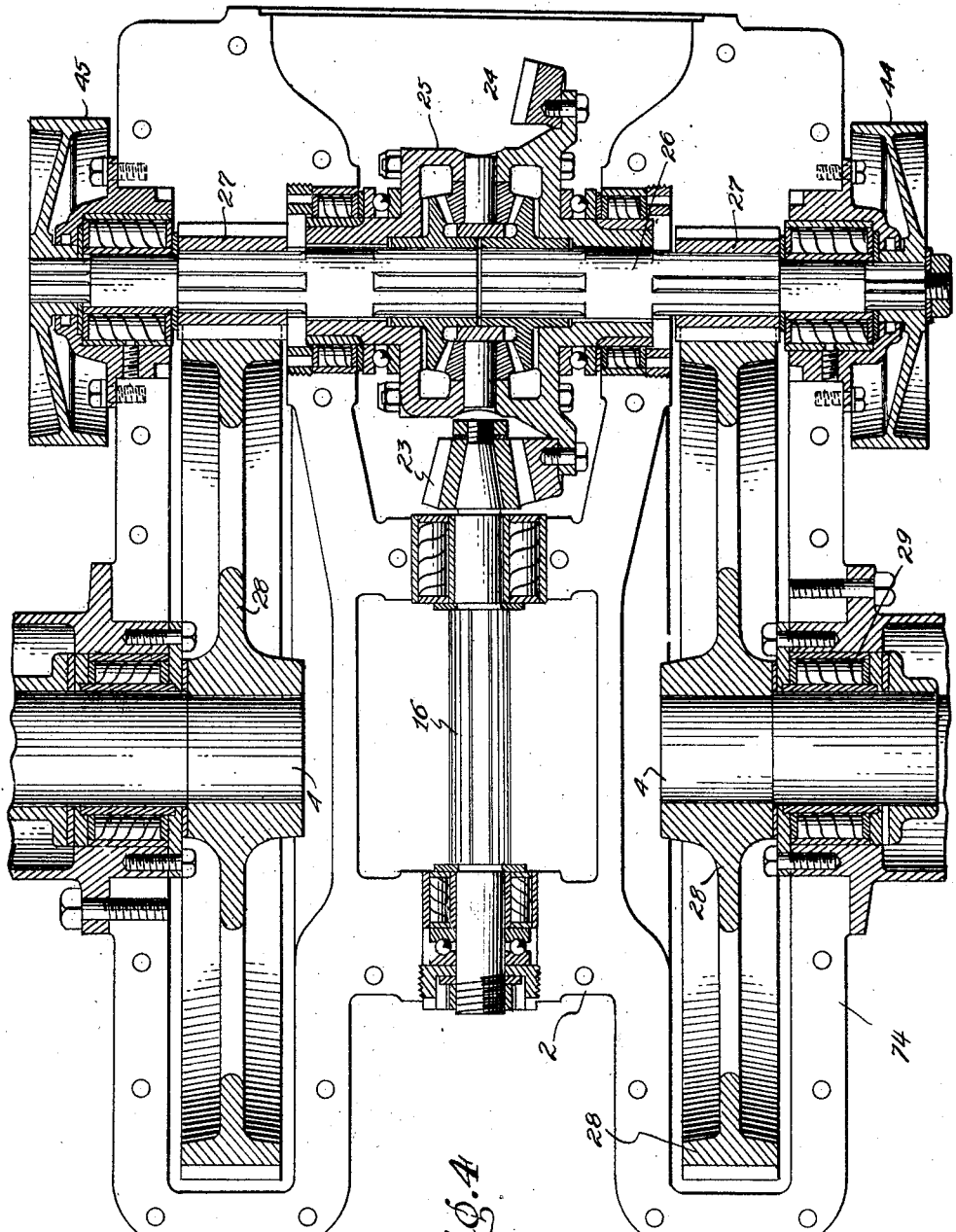

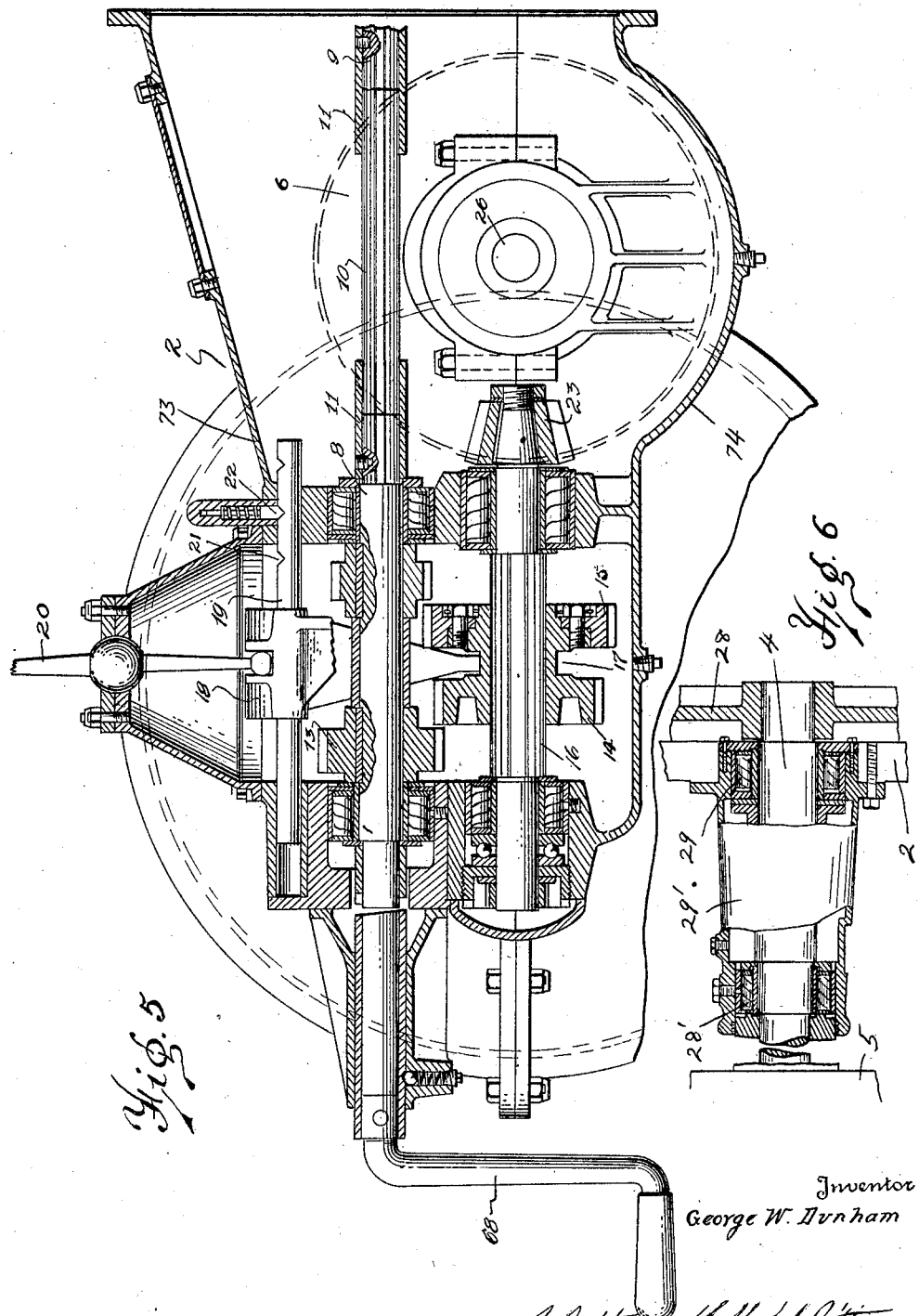

Patented May 15, 1923.

1,455,394

UNITED STATES PATENT OFFICE.

GEORGE W. DUNHAM, OF NEW YORK, N. Y., ASSIGNOR TO GRAHAM BROTHERS, OF EVANSVILLE, INDIANA, A CORPORATION OF INDIANA.

TRACTOR.

Application filed January 30, 1920. Serial No. 355,155.

*To all whom it may concern:*

Be it known that I, GEORGE W. DUNHAM, a citizen of the United States of America, residing at New York, in the county of New York and State of New York, have invented certain new and useful Improvements in Tractors, of which the following is a specification, reference being had therein to the accompanying drawings.

The invention relates to tractors and refers more particularly to that type having rear wheels and front steering wheels. One of the objects of the invention is the provision of means for facilitating the turning of the tractor. Another object is to provide an arrangement in which the power take-off mechanism can be gradually operatively connected to the engine. A further object is the provision of a starting crank for the engine at the rear of the tractor and adjacent to the engine clutch control pedal, whereby one person would be able to release the engine clutch and rotate the starting crank to the desired position preliminary to cranking the engine. A still further object is the provision of a short drive wheel stub shaft having but one inner bearing in the tractor frame. Other objects of the invention reside in the novel arrangements and combinations of parts as more fully hereinafter set forth.

In the drawings:

Figure 1 is a vertical sectional view through a portion of a tractor embodying my invention;

Figure 2 is a top plan view of the transmission housing;

Figure 3 is a side elevation;

Figure 4 is a horizontal sectional view through a portion of the transmission housing;

Figure 5 is a central vertical section therethrough;

Figure 6 is a sectional elevation of a portion of the rear axle.

1 is the engine, and 2 the transmission housing secured to the engine housing and forming a unit construction of frame. 3 are side sills of a sub-frame extending from the front axle rearward of the rear axle and forming the reach connection between the axles. The rear axle comprises the aligned stub shafts 4 upon the outer ends of which are mounted the drive wheels 5.

6 is the main drive shaft adapted to be operatively connected to the engine 1 by means of the clutch 7. This main drive shaft is formed of a plurality of sections 8, 9 and 10, the sections 8 and 9 being mounted in suitable bearings in cross partitions of the housing 2 while the section 10 is intermediate the sections 8 and 9 and non-rotatably secured thereto as by means of the sleeves 11 surrounding the adjacent ends of the sections 8 and 10 and 9 and 10, and preferably splined thereto. Suitable transmission or change-speed gears 12 and 13 are provided fixedly mounted upon the section 8 and other transmission or change-speed gears 14 and 15 are provided slidably mounted upon the counter shaft 16 and preferably splined thereto, the gears 14 and 15 being preferably integral and forming the annular groove 17 therebetween, which is engaged in by the fork 18 upon the gear shifter rod 19 longitudinally slidably mounted in the housing 2. 20 is a gear shifter lever for actuating the rod 19, the latter having the series of notches 21 adapted for engagement with the spring pressed detent member 22 to hold the rod in its adjusted position. The counter shaft 16 has fixedly secured at its inner end the bevel pinion 23 which meshes with the bevel gear wheel 24 of the differential gearing 25. The transmission or change-speed gearing is located between the inner ends of the stub shafts 4.

This differential gearing is mounted upon the inner ends of the jack shafts 26 which are mounted in the housing 2 forward of the stub shafts 4. Pinions 27 non-rotatably mounted upon the jack shafts mesh with the gear wheels 28 non-rotatably mounted upon the inner ends of the stub shafts, each of which engages an inner bearing 29 in the housing 2 outside and adjacent to the gear wheel and an outer bearing 28' in the outer end of the housing extension 29' bolted to the side of the housing 2. With this arrangement the number of parts as well as the weight of the tractor is decreased and furthermore clearance is provided between the inner ends of the stub shafts.

30 is a housing section forming part of the transmission housing 2 and suitably rigidly secured to the engine housing 1 and the rear section of the transmission housing. This housing section 30 carries the power take off mechanism which comprises a suitable wheel or pulley 31 at the side of the housing section 30 and mounted upon the shaft 32, the inner end of which is secured to the bevel gear wheel 33 supported inside the housing section and meshing with the bevel pinion 34 rotatably mounted upon the section 9 of the main drive shaft. The pinion 34 is provided with the jaw clutch teeth 35 which are adapted to engage the jaw clutch teeth 36 upon the collar 37, slidably splined upon the section 9 and adapted to be moved into engagement with the pinion by means of the forked rod 38 depending into the housing 2 and mounted upon the rod 39 which longitudinally slidably engages in the bearings 40 and 41 upon the transmission housing respectively at the front and rear ends of the rod. The bearing 40 contains the spring pressed detent member 42 for engaging in the notches 43 in the rod 39 for holding the latter in either of its adjusted positions. With this arrangement, the power take-off mechanism can be positively connected to the main drive shaft when the latter is stationary, due to the fact that the operator can release the engine clutch. Then the engine clutch can be gradually engaged to drive the power-take-off mechanism, thereby avoiding shock due to sudden impact.

For the purpose of facilitating in the steering of the tractor; (the front wheels being steered by the usual hand wheel). I have provided brakes which are located at the outer ends of the jack shafts and which can be alternatively applied. As shown, 44 and 45 are brake wheels or drums non-rotatably mounted on the outer ends of the jack shafts 26, and 46 and 47 are brake bands adapted to be clamped respectively upon these drums. For actuating these brake bands the foot pedals 48 and 49 are provided pivoted at the rear of the housing 2 and suitably connected to their respective brake bands. These foot pedals have depending arms 50 and the depending arm of the foot pedal 48 is pivotally connected to the link 51 the forward end of which is pivotally connected to the lever 52 pivoted intermediate its ends for tightening the brake band 46 upon its brake drum. The depending arm of the foot pedal 49 is pivotally connected to the link 53, the forward end of which is pivotally connected to the rock arm 54 having its lower end non-rotatably secured to the rod 55 extending transversely beneath the housing 2. The opposite end of this rod 55 has the rock arm 56 pivotally connected to the link 57 extending forward and pivotally connected at its forward end to the lever 58 for actuating the brake band 47.

59 is another foot pedal pivotally mounted at the rear of the housing 2 and adjacent to the foot pedals 48 and 49, this foot pedal 59 being adapted to release the engine clutch 7. This foot pedal has a depending arm similar to the other foot pedals, which is pivotally connected to the link 60 secured at its forward end to the rock arm 61, which is in turn secured to the sleeve 62, surrounding the rod 55 and extending transversely beneath the tractor. The opposite end of the sleeve has the rock arm 63 which is connected to the link 64 which is non-rotatably secured to the shaft 66 upon which is mounted the yoke 67 for releasing the clutch.

In turning the tractor to the right or left, the turning movement is facilitated by respectively actuating the foot pedals 48 or 49 to apply their respective brake bands which frictionally reduce the power applied to the drive wheels upon their respective sides of the tractor thereby allowing of greater movement of the other drive wheel, which is possible due to the differential gearing. This arrangement has a further advantage in that under certain conditions where one or the other drive wheel loses traction from any cause, it can be either partly or completely prevented from turning by depressing the foot pedal to actuate the brake on the same side of the tractor as the drive wheel, whereby the other drive wheel having traction will drive the tractor.

Another important consideration is that the application of the brakes provides a more minute and steady steering adjustment than the hand wheel. If the tractor deviates from its course and the hand wheel is actuated to bring the same back to its correct position, there is great liability that the front wheels will swerve too far in the opposite direction and thus produce a lateral reciprocating movement in a forward direction. By applying the correct brake the turning movement of the tractor will be steady and the operator can readily bring the tractor back to its original direction.

68 is a starting crank for the engine, this starting crank being located at the rear of the tractor and being adapted to be operatively connected to the rear end of the main drive shaft 6. This starting crank is located adjacent to the foot pedal 59 so that if it is not in the desired angular relation when its ratchet teeth are in engagement with those on the main drive shaft it may be readily rotated by depressing the foot pedal 59 to release the clutch 7 to the desired position when the foot pedal 59 may be released to permit of engagement of the clutch, so that upon further turning of the starting crank the engine will also be rotated to start the same. It will be readily seen that the construction is such that one person may operate the starting crank and the engine clutch pedal at the same time so that only the main drive shaft will be turned. Furthermore, since the gear shifter lever and the power take-off mechanism control lever are at the rear of the machine they may be readily placed in neutral before turning the starting crank.

69 is a platform secured upon the side sills 3 to the rear of the rear axle and below the foot pedals, and 70 is a suitable draw bar also secured to the side sills by means of the cross bar 71 and pin 72.

For the purpose of providing ready accessibility of the parts the rear section of the transmission housing 2 is formed of complementary upper and lower portions 73 and 74 respectively, having their meeting edges in the planes of the axes of the stub shafts 4, the jack shafts 26 and the counter shaft 16. The upper portion 73 has the aperture or hand hole 75 normally covered by the cover plate 76. By removing this cover plate the securing means 77, such as a screw, for the forward sleeve 11 surrounding the adjacent ends of the front and intermediate sections of the main drive shaft may be removed and this sleeve slid back over the intermediate section to clear the rear end of the front section when the upper portion 73 of the housing may be detached, after having removed the means securing this portion to the lower portion and the housing section 30. The change-speed gears, the differential gearing and other parts enclosed within the rear section of the housing can now be easily inspected, and if necessary, removed and replaced.

In order to provide ready accessibility to the parts enclosed within the housing section 30 the containers 78 for the anti-friction bearing 79 near the rear end of the front section 9 of the main drive shaft is removably secured in the rear cross-partition of the housing section, as by means of the cap bolts 80. The anti-friction bearing has the outer and inner race members 81 and 82, respectively, between which are located the balls 83. The outer race member is secured in the bearing container 78 by means of the outer nut 84 threadedly engaging the rear end portion of the container, while the inner race member 82 is retained in place by means of the inner nut 85 engaging the rear end of the inner race member and threadedly engaging the front section 9.

The upper portion 73 of the rear section of the transmission housing being removed, the bearing container 78 can be readily removed by detaching the cap bolts 80 and the inner nut 85 when the anti-friction bearing 79 can be bodily slid back over the front section 9 with the bearing container 78, the latter being provided for this purpose with the inwardly extending flange 86 at its forward end extending over the forward end of the outer race member 81.

For the purpose of preventing binding of the bevelled pinion 34, the portion of the front section 9 of the main drive shaft upon which the bushing 87 for the bevelled pinion is mounted is of slightly greater diameter than the portion engaged by the inner race member 82, and the washer 88 is provided between the rear shoulder of this enlarged portion and the inner race member. This arrangement prevents binding of the bevelled pinion 34, since the forward movement of the anti-friction bearing relative to the bevelled pinion is limited by the above-mentioned rear shoulder and washer. After the bearing container has been removed the bevelled pinion 34 may also be removed by sliding the same back over the front section 9. The collar 37 may be also removed in the same manner, the internal diameter of the splines of this collar being such that this is possible.

What I claim as my invention is:

1. The combination with an engine, of drive wheels, transmission connected to said drive wheels, a clutch for operatively connecting said engine to said transmission, means for operating said clutch, power take-off mechanism adapted to be driven from said transmission, a clutch for operatively connecting said power take-off to said transmission, and a starting crank for said engine at the rear of said transmission and at the side of said clutch operating means.

2. In a tractor, the combination with a frame, of a stub shaft mounted in said frame, a drive wheel non-rotatably mounted upon the outer end of said stub shaft and a gear wheel non-rotatably mounted on the inner end of said stub shaft, the bearing portion of said stub shaft upon said frame being outside said gear wheel.

3. In a tractor, the combination with an engine and a transmission adapted to be operatively connected to said engine, said transmission including a counter shaft and a main drive shaft comprising a plurality of sections and a sleeve non-rotatably securing adjacent ends of said sections to each other, of a transmission housing having complementary upper and lower portions with their meeting edges in the plane of the axis of said counter shaft, one of said portions provided with means for permitting of disengagement of said sleeve from one of said sections.

4. In a tractor, the combination with an engine transmission adapted to be operatively connected to said engine, said transmission including a counter shaft, a main drive shaft comprising rear, intermediate and front sections, sleeves surrounding adjacent ends of said sections and non-rotatably securing the same to each other, and means for fixedly securing each of said sleeves to one shaft section, and jack shafts adapted to be driven from said counter shaft, of a transmission housing having complementary upper and lower portions with their meeting edges in the plane of the axes of said jack shafts and counter shaft, said upper housing portion provided with a hand hole for permitting of disengaging the securing means for one of said sleeves and subsequently disengaging said sleeve from one of said shaft sections.

5. In a tractor, the combination with a housing having a cross partition, of a drive shaft extending through said partition, a bearing container surrounding said drive shaft and removably secured to said partition, an anti-friction bearing mounted in said container and removable therewith as a unit, said bearing comprising inner and outer race members and anti-friction members therebetween, and a nut engageable with said inner race member and threadedly engaging said drive shaft.

6. In a tractor, the combination with an engine and a transmission housing forming a unit construction, said transmission housing comprising a front section provided with a cross partition and a rear section provided with complementary upper and lower portions, of a drive shaft comprising a front section mounted in said front housing section and an aligned section in rear of said front section, and mounted in said upper housing portion a sleeve surrounding adjacent ends of said shaft sections and non-rotatably securing the same to each other, mechanism on said front shaft section forward of said cross partition, means in said upper housing portion for permitting of sliding said sleeve off said front shaft section, whereby said upper housing portion can be removed, a bearing container surrounding said front shaft section and removably secured to said cross partition and an anti-friction bearing mounted in said container and removable therewith as a unit, the outer diameter of said bearing container being such that said mechanism on said front shaft section may be slid off said front shaft section when said bearing container is removed.

7. The combination with a housing having a cross partition, of a drive shaft extending through said partition, a gear, mounted on said shaft inside said housing, an anti-friction bearing for said shaft movably mounted in said partition, and means for limiting the inward movement of said bearing relative to said shaft to prevent binding of said gear.

8. The combination with a housing having a cross partition, of a drive shaft extending through said partition, an enlargement on said shaft inside said housing, a gear mounted on said enlargement, an anti-friction bearing for said shaft mounted in said partition, and a bearing between said bearing and enlargement and adapted to be engaged by said gear.

9. The combination with an engine, of a transmission shaft, a clutch for operatively connecting said shaft to said engine, a pedal for actuating said clutch, and a starting crank for said engine adapted to be operatively connected to said shaft at the end opposite to said clutch, said starting crank being at the side of said clutch actuating pedal.

10. The combination with an engine and a transmission adapted to be operatively connected to said engine, said transmission including parallel shafts one of which comprises a plurality of sections, and means for non-rotatably securing adjacent ends of said sections to each other, of a transmission housing having a removable part carrying said sectional shaft, said housing being provided with means for permitting of disengagement of said means for non-rotatably securing said shaft sections to each other.

11. The combination with an engine and a transmission adapted to be operatively connected to said engine, said transmission including parallel shafts, one of which comprises a plurality of sections, and means for non-rotatably securing adjacent ends of said sections to each other, of a two-part transmission housing having the meeting edges of its parts substantially in the plane of the axis of said shaft parallel to said sectional shaft, said transmission being provided with means for permitting of disengagement of said means for securing said shaft sections to each other.

12. The combination with a housing having a cross partition with an aperture therethrough, of a drive shaft extending through said aperture, a mechanism longitudinally slidably mounted upon said drive shaft at one side of said partition and adapted to pass through said aperture, and a bearing for said drive shaft removably mounted upon said partition.

13. The combination with an engine, of transmission gearing, a clutch for operatively connecting said engine to said transmission gearing, means for operating said clutch, and a starting crank for said engine at the rear of said transmission gearing and at the side of said clutch operating means.

14. The combination with an engine, of transmission gearing, drive wheels operatively connected to said gearing, a clutch for operatively connecting said gearing to said engine, a member at the rear of said gearing for actuating said clutch, and a starting crank for said engine adapted to be operatively connected thereto through said gearing and clutch, said starting crank being at the rear of said gearing and at the side of said clutch actuating member.

In testimony whereof I affix my signature.

GEORGE W. DUNHAM.